United States Patent [19]
Perrin et al.

[15] 3,688,884
[45] Sept. 5, 1972

[54] VISCOSITY COUPLING, ESPECIALLY FOR COUPLING A FAN TO ITS DRIVE IN AN INTERNAL COMBUSTION ENGINE

[72] Inventors: Gunter Perrin, Stuttgart; Gerhard Pabinger, Stetten, Remstal, both of Germany

[73] Assignee: Daimler-Benz Aktiengesellschaft, Stuttgart-Untertuerkheim, Germany

[22] Filed: Dec. 4, 1970

[21] Appl. No.: 95,089

[30] Foreign Application Priority Data

Dec. 5, 1969 Germany..........P 19 61 107.5

[52] U.S. Cl. ...............................................192/58 B
[51] Int. Cl............................................F16d 35/00
[58] Field of Search .....................................192/58 B

[56] References Cited

UNITED STATES PATENTS 3,559,786  2/1971  Long, Jr....................192/58 B
3,458,020  7/1969  Lutz..........................192/58 B Primary Examiner—Allan D. Herrmann
Attorney—Craig and Antonelli

[57] ABSTRACT

A viscosity coupling, particularly for the coupling of a fan with its drive in an internal combustion engine, which has a working space that includes entrainment surfaces which are disposed opposite one another at slight distances and are provided at the two parts to be coupled with one another; the working space is connected by way of one or several openings with a reservoir space for the viscosity liquid, from which the liquid is fed to the working space as a function of an adjusting magnitude; an intermediate chamber is arranged between the working space and the reservoir space, in which terminates the feed line from the reservoir space whereby the intermediate chamber is so connected with the working space that the viscosity liquid flows from the intermediate chamber into the working space no further inwardly than the inner circumference of the liquid ring present in the working space.

37 Claims, 4 Drawing Figures

PATENTED SEP 5 1972    3,688,884
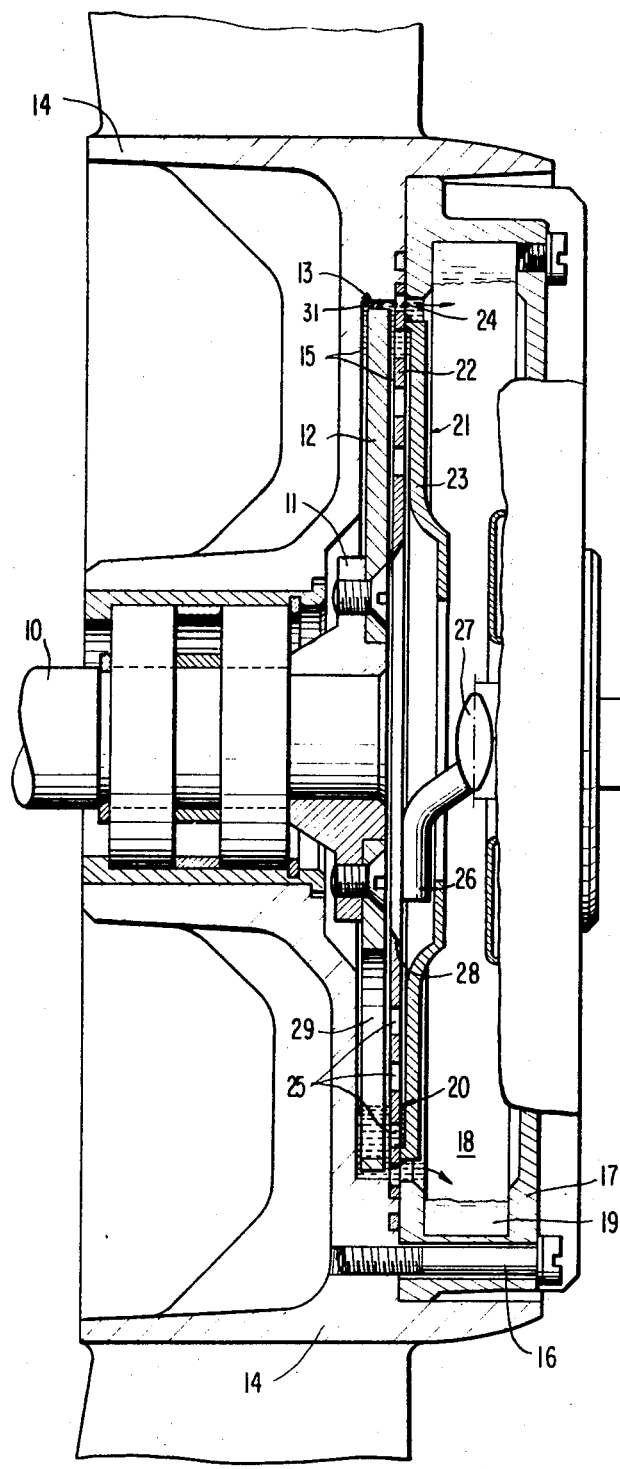
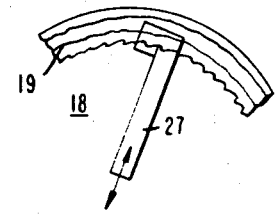
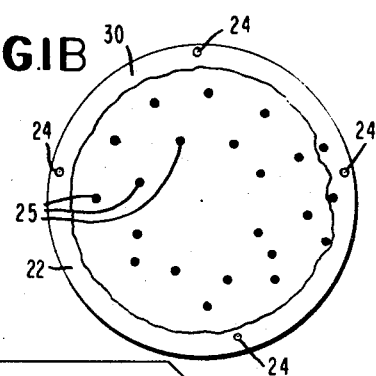
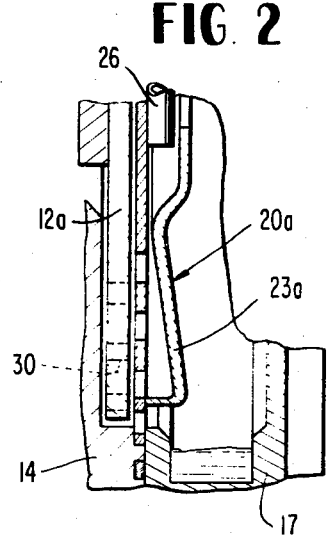
INVENTORS
GÜNTER PERRIN
GERHARD PABINGER
BY Craig, Antonelli, Stewart & Hill
ATTORNEYS

VISCOSITY COUPLING, ESPECIALLY FOR COUPLING A FAN TO ITS DRIVE IN AN INTERNAL COMBUSTION ENGINE

The present invention relates to a viscosity coupling, especially for coupling a fan to its drive in an internal combustion engine, with a working space which includes entrainment surfaces at the two parts to be coupled with one another and disposed mutually opposite one another with slight gaps, and which is connected by one or several apertures with a reservoir space for the viscous liquid, from which the viscous liquid is returned to the working space in dependence on an adjusting magnitude.

Viscosity couplings of the aforementioned type are known and also customary for fan drives in motor vehicles. The temperature of the cooling medium serves in that case for the most part as adjusting magnitude, i.e., the adjustment is taken off from a temperature displacement transmitter or pick-up. In one known prior art coupling of this type, the working space and reservoir space are separated by a disk that is pre-curved at its inner circumference in the direction toward the reservoir space. A short feed connecting pipe extends into this curved portion and the viscous liquid thereby enters into the working space at the inner circumference thereof.

This viscosity coupling, however, is disadvantageous, for it has been discovered that rotational speed jumps suddenly occur on the secondary side above all in the adjusting range of primary interest with a constant primary rotational speed and without the slightest change of the adjusting displacement, whereby as a matter of fact these rotational speed jumps may amount up to 3/4 of the rotational speed range to be adjusted. In this manner, an accurate displacement-dependent control is rendered impossible. Probably this disadvantageous phenomenon is to be traced back to an uneven and above all non-controllable distribution of the viscous liquid in the working space.

The present invention is therefore concerned with the task to avoid the aforementioned disadvantages, i.e., to provide a viscosity coupling, by means of which an accurate control as a function of displacement can be achieved. The underlying problems are solved with the viscosity couplings of the aforementioned type in that an intermediate chamber is arranged between the reservoir space and the working space, in which terminates the feed line from the reservoir space and which is connected with the working space in such a manner that the viscous liquid flows from the intermediate space into the working space substantially no further inwardly than at the inner circumference of the liquid ring present thereat. The present invention prefers a solution with the aforementioned prior art viscosity couplings, according to which a disk member forming the intermediate chamber is arranged between the driving disk and the reservoir space, whereby the disk member includes a first wall facing the driving disk which is provided with feed apertures distributed uniformly over its surface.

The advantage is achieved by the present invention that the inflowing quantity of the viscous liquid always enters the working space no further inwardly than at the inner circumference of the liquid ring present in the working space. This liquid ring can therefore build up from its inner circumference, so to speak of, i.e., may enlarge itself, and it is avoided in this manner that uncontrollable—for example, spirally shaped—liquid strias or lamellae are present in the working space. Additionally, a liquid quantity that may eventually flow in shock-like, is initially distributed, so to speak, by the intermediate chamber so that it enters continuously into the working space in the manner described. An exact control as a function of the adjustment or displacement path can be achieved in this manner which is of special significance particularly for the application described above.

In one preferred embodiment according to the present invention, the feed apertures in the first wall of the intermediate chamber are arranged extending in a spiral shape from the inside toward the outside. However, a radial or also any other arrangement would be feasible whereby only the uniform distribution over the entire surface is important. It is additionally proposed by the present invention that return apertures be arranged in the first wall of the intermediate chamber at a place corresponding to the outer diameter of the working space and that the second wall of the intermediate chamber facing the reservoir space is connected sealingly with the first wall intermediate these return apertures and the outermost feed apertures.

The intermediate chamber can be constructed according to the present invention disk-shaped, however, it may also either widen or narrow with increasing diameter. If the cross section of the intermediate chamber changes with the diameter, the relation between the liquid quantity supplied by the scoop tube into the intermediate chamber and the liquid ring width in the working gaps can be changed continuously. The characteristic of the coupling dependent on the adjustment path of the scoop pipe can be derived therefrom. A similar effect can also be achieved by a corresponding configuration of the reservoir space, in that case even also without intermediate chamber.

It is known to arrange one or several scoop tubes in the reservoir space of such viscosity couplings which do not rotate but which are movable for changing the intensity of the liquid feed from the reservoir to the working space. In that regard, the present invention additionally proposes that the short feed pipe or stub extending from the inner scoop tube end into the intermediate chamber terminates essentially within the inner area thereof. It is then appropriate if, according to a further proposal and feature of the present invention, for the purpose of a sure collection and interception of the working liquid leaving the feed stub or pipe, the first wall of the intermediate chamber extends correspondingly conically at the inner edge. It is also feasible, however, within the scope of the present invention to construct this first wall without any central aperture, i.e., closed; however, this is frequently not possible for assembly reasons. For a more uniform distribution of the viscous liquid in the working gaps on both sides of the driving disk, the present invention then additionally proposes that several radially extending slots be arranged in the driving disk or several uniformly distributed bores be arranged over the entire surface thereof.

Accordingly, it is an object of the present invention to provide a viscosity coupling for drivingly connecting a fan with an internal combustion engine which obviates by simple means the aforementioned shortcomings and drawbacks encountered in the prior art constructions.

Another object of the present invention resides in a viscosity coupling of the type described above which permits the attainment of an exact control as a function of the displacement path.

A further object of the present invention resides in a viscosity coupling for the drive of a fan of an internal combustion engine which permits an improved control essentially without abrupt changes in the rotational speeds as a function of a predetermined control magnitude.

Still a further object of the present invention resides in a viscosity coupling of the type described above which is simple in construction, easy to manufacture and reliable in operation.

These and other objects, features and advantages of the present invention will become more obvious from the following description when taken in connection with the accompanying drawing which shows, for purposes of illustration only, two embodiments in accordance with the present invention, and wherein:

FIG. 1 is an axial longitudinal cross-sectional view through a viscosity coupling according to the present invention for the fan drive of an internal combustion engine;

FIG. 1A is a schematic illustration of the relationship between scoop 27 and reservoir 18, taken in a plane perpendicular to the plane of FIG. 1;

FIG. 2A is a schematic illustration of the spiral aperture pattern on wall 22, taken in a plane perpendicular to the plane of FIG. 1;

FIG. 2 is a partial axial longitudinal cross-sectional view, similar to FIG. 1, through a modified embodiment of a coupling in accordance with the present invention.

Referring now to the drawing wherein like reference numerals are used throughout the two views to designate like parts, and more particularly to FIG. 1, reference numeral 10 designates in this figure a drive shaft which is driven from the crankshaft of the driving engine in a conventional manner (not illustrated). A drive disk 12 is secured at the drive shaft 10 by means of a flange 11. The drive disk 12 rotates within a working space generally designated by reference number 13 which is formed by the housing 14. The working gaps 15 are disposed in a conventional manner between the driving disk 12 and the housing wall as well as the intermediate disk 20.

A further housing part 17 is secured at the housing 14 by means of bolts 16 which forms the reservoir space 18. The viscous liquid collects in the reservoir space 18 in the form of a more or less strong liquid ring 19. An intermediate chamber generally designated by reference numeral 20 is located between the working space 13 and the supply or reservoir space 18, which is formed by a disk structure generally designated by reference numeral 20 that includes a first wall 22 facing the working space 13 and a second wall 23 facing the reservoir space 18 that extend parallel to one another. The first wall 22 is extended radially outward beyond the working space 13 and serves for the connection of the intermediate element 21 between the housing 14 and the housing part 17. Additionally, the first wall 22 is provided with return apertures or openings 24 within the outermost area of the working space 13.

Feed apertures or openings 25 are provided in the first wall 22 which are uniformly distributed over the entire surface. In the illustrated embodiment, the feed apertures 25 are arranged in a spiral shape (see FIG. 1B). The second wall 23 of the disk element 21 is secured with its outer edge at the first wall 22 intermediate the return apertures 24 and the outermost feed apertures 25, for example, is welded thereto. This second wall 23 is drawn in the inner area thereof in the direction toward the reservoir space 18 in order to accommodate the short feed pipe or stub 26 of a scoop tube 27 which does not rotate and can be conventionally displaced in the reservoir space 18 as a function of a temperature pick-up or transmitter (not shown) in such a manner that is immerses more or less into the liquid ring 19. Since such an arrangement is known as such, the details of this temperature-dependent control are not illustrated. FIG. 1A schematically illustrates the relationship between the scoop 27 and reservoir 18 with the arrows representing adjusting movement of the scoop to take in varying amounts of liquid from the ring 19. The first wall 22 is provided in the inner area with a conical, inclined surface 28 in order to prevent that the liquid quantity leaving the short feed pipe 26 might possibly enter directly into the working space 13.

OPERATION

The operation of the viscosity coupling illustrated and described in connection with FIG. 1 is as follows.

If an adjustment pulse arrives from the temperature displacement pick-up or transmitter with increasing temperature of the cooling medium, then the scoop pipe 27 immerses more deeply into the liquid ring 19. Consequently, it scoops liquid out of the reservoir space 18, and this liquid flows through the feed stub 26 into the intermediate chamber 20. It distributes itself uniformly in the intermediate chamber 20 and then enters through the respective aperture 25 into the working space 13 which is located at the inner edge of the liquid ring 31 rotating thereat. Consequently, the liquid ring 31 in the working space 13 is enlarged from its inner circumference whereby the feed liquid quantity can distribute itself by way of the slots 29 in the working disk 12 uniformly to both working gaps 15. Since the liquid ring 31 in the working space 13 becomes larger, the coupling is also able to transmit a larger torque, and the secondary rotational speed increases until an equilibrium condition is again established between the supplied liquid quantity and the returning liquid quantity flowing through the return apertures 24.

According to FIG. 2, the intermediate chamber generally designated by reference numeral 20a has a cross section that becomes wider in the outward direction. This is achieved by a corresponding configuration of the second wall 23a that is conically inclined in that embodiment. The quantity discharged from the short feed pipe 26 therefore enters—depending on the effective diameter—more or less rapidly into the working space. Uniformly distributed bores 30 are provided in the working disk 12 instead of the slots 29 of FIG. 1.

While we have shown and described only two embodiments in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

What we claim is:

1. A viscosity coupling comprising: a driving member having entrainment surface means, a driven member having entrainment surface means, said driving and driven members being arranged for relative rotative motion with respect to a longitudinal axis of the coupling, a working space, the respective entrainment surface means of the driving and driven members being disposed in the working space mutually opposite one another with slight gaps therebetween, a reservoir space containing a supply of viscous working liquid, and communicating means for communicating the liquid in the reservoir space with the working space, said communicating means including adjusting means responsive to an adjusting magnitude for controlling the amount of liquid communicated to the working space and liquid introducing means for introducing the liquid into the working space substantially no further radially inwardly than the inner radial extent of a liquid annular ring already formed in the working space by liquid previously introduced to said working space.

2. A viscosity coupling according to claim 1, wherein said introducing means includes an intermediate chamber means arranged between the working space and the reservoir space and a feed line means from the reservoir space terminating in the intermediate chamber means, and wherein said intermediate chamber means is operatively connected with the working space in such a manner that the liquid flows from the intermediate chamber means into the working space at a radial distance that is located at most substantially along the inner circumference of the liquid ring present in the working space.

3. A viscosity coupling according to claim 2, characterized in that the driving member is connected with an internal combustion engine and the driven member is connected with a fan of the internal combustion engine.

4. A viscosity coupling according to claim 2, wherein said adjusting means includes stationary scoop tube means movable for changing the intensity of the liquid feed from the reservoir space to the working space, characterized in that a short feed pipe extending from the inner end of the scoop tube means into the intermediate chamber means terminates essentially within the inner area of the intermediate chamber means.

5. A viscosity coupling according to claim 2, characterized in that the intermediate chamber means has a disk-shaped cross section.

6. A viscosity coupling according to claim 2, characterized in that the intermediate chamber means has a cross section that widens.

7. A viscosity coupling according to claim 2, characterized in that the cross section of the intermediate chamber means becomes wider in the outward direction.

8. A viscosity coupling according to claim 2, characterized in that the cross section of the intermediate chamber means becomes wider in the inward direction.

9. A viscosity coupling according to claim 2, wherein said reservoir space is formed in a housing operatively connected with the output of the coupling, wherein said driving member comprises a driving disk means arranged in said housing, and wherein said intermediate chamber means is formed in a further disk means positioned between said driving disk means and said reservoir space, said further disk means including a first wall means facing the driving disk means, said first wall means being provided with feed aperture means distributed substantially uniformly over the surface thereof for introducing liquid from said intermediate chamber to said working space.

10. A viscosity coupling according to claim 9, characterized in that the output is constituted by said housing.

11. A viscosity coupling according to claim 9, characterized in that the feed aperture means in the first wall means are arranged spirally shaped.

12. A viscosity coupling according to claim 11, characterized in that return aperture means are arranged in the first wall means along a place corresponding to the outer diameter area of the working space, and in that a second wall means of the disk means facing the reservoir space is sealingly connected radially with the first wall means intermediate the return aperture means and the outer feed aperture means.

13. A viscosity coupling according to claim 12, wherein said adjusting means includes stationary scoop tube means movable for changing the intensity of the liquid feed from the reservoir space to the working space, characterized in that a short feed pipe extending from the inner end of the scoop tube means into the intermediate chamber means terminates essentially within the inner area of the intermediate chamber means.

14. A viscosity coupling according to claim 13, characterized in that the first wall means extends conically at the inner edge thereof for a safe interception of the working liquid discharged from the feed pipe.

15. A viscosity coupling according to claim 14, characterized in that several radially extending slots are arranged in the driving disk.

16. A viscosity coupling according to claim 14, characterized in that bores distributed uniformly over the entire surface are arranged in the driving disk.

17. A viscosity coupling according to claim 14, characterized in that the intermediate chamber means has a disk-shaped cross section.

18. A viscosity coupling according to claim 14, characterized in that the intermediate chamber means has a cross section that widens.

19. A viscosity coupling according to claim 14, characterized in that the cross section of the intermediate chamber means becomes wider in the outward direction.

20. A viscosity coupling according to claim 14, characterized in that the cross section of the intermediate chamber means becomes wider in the inward direction.

21. A viscosity coupling according to claim 14, characterized in that the cross section of the intermediate chamber means changes in the radial direction by a corresponding configuration of the second wall means.

22. A viscosity coupling according to claim 18, characterized in that the reservoir space has a cross section that changes in the radial direction.

23. A viscosity coupling according to claim 22, characterized in that the cross section of the reservoir space becomes wider in the outward direction.

24. A viscosity coupling according to claim 22, characterized in that the cross section of the reservoir space becomes wider in the inward direction.

25. A viscosity coupling according to claim 9, characterized in that return aperture means are arranged in the first wall means along a place corresponding to the outer diameter area of the working space, and in that a second wall means of the disk means facing the reservoir space is sealingly connected radially with the first wall means intermediate the return aperture means and the outer feed aperture means.

26. A viscosity coupling according to claim 9, characterized in that the first wall means extends conically at the inner edge thereof for a safe interception of the working liquid discharged from the feed pipe.

27. A viscosity coupling according to claim 9, characterized in that several radially extending slots are arranged in the driving disk.

28. A viscosity coupling according to claim 9, characterized in that bores distributed uniformly over the entire surface are arranged in the driving disk.

29. A viscosity coupling according to claim 1, wherein said reservoir space is located radially outwardly of said working space with respect to said longitudinal axis.

30. A viscosity coupling according to claim 1, wherein said reservoir space is formed in a housing operatively connected with the output of the coupling, wherein said driving member comprises a driving disk means arranged in said housing, and wherein said introducing means includes a further disk means positioned between said driving disk means and said reservoir space, said further disk means including a plurality of continuously open feed apertures for introducing liquid to said working space.

31. A viscosity coupling according to claim 30, wherein said feed apertures are distributed substantially uniformly over the surface of said further disk means.

32. A viscosity coupling according to claim 30, wherein said further disk means includes two disk shaped walls defining an intermediate chamber therebetween, and wherein said liquid is communicated from said reservoir space to said working space by way of said intermediate chamber.

33. A viscosity coupling according to claim 32, wherein said feed apertures are disposed in one of said walls, and wherein the other of said walls is substantially solid in the region thereof disposed opposite said feed apertures.

34. A viscosity coupling according to claim 33, wherein said liquid in said reservoir space is arranged in a reservoir space annular ring at the radial outward extent of said reservoir space during rotation of said housing, and wherein radially inwardly extending pipe means are provided for transferring said liquid from said reservoir space annular ring to said intermediate space by way of a central opening in the other of said walls.

35. A viscosity coupling according to claim 1, wherein said reservoir space is formed in a housing operatively connected with the output of the coupling, and wherein said liquid in said reservoir space is arranged in a reservoir space annular ring at the radial outward extent of said reservoir space during rotation of said housing, and wherein said fluid is communicated from said reservoir space annular ring to said working space by way of a first radially inwardly extending path and then by way of a second radially outwardly extending path.

36. A viscosity coupling according to claim 35, wherein said first and second radially extending paths are in contact with surfaces of a disk means arranged between said reservoir space and said working space.

37. A viscosity coupling according to claim 25, characterized in that the cross section of the intermediate chamber means changes in the radial direction by a corresponding configuration of the second wall means.

* * * * *